United States Patent [19]

Ota

[11] 4,346,397
[45] Aug. 24, 1982

[54] APPARATUS FOR REPRODUCING A VIDEO SIGNAL OF ONE SYSTEM WITH CONVERSION TO A VIDEO SIGNAL OF ANOTHER SYSTEM

[75] Inventor: Yoshihiko Ota, Yokohama, Japan

[73] Assignee: Victor Company of Japan, Ltd., Yokohama, Japan

[21] Appl. No.: 5,688

[22] Filed: Jan. 23, 1979

[30] Foreign Application Priority Data

Jan. 23, 1978 [JP] Japan .................... 53-5225
Jan. 23, 1978 [JP] Japan .................... 53-5226
Jan. 23, 1978 [JP] Japan .................... 53-5227
Jan. 23, 1978 [JP] Japan .................... 53-5228

[51] Int. Cl.³ ............................................. H04N 5/78
[52] U.S. Cl. ........................................ 358/4; 358/11;
358/140; 360/9; 360/33; 360/73; 360/75; 360/84
[58] Field of Search ............... 360/9, 37, 10, 33, 70, 360/73, 75, 64, 84; 358/4, 140, 11

[56] References Cited

U.S. PATENT DOCUMENTS

| | | | |
|---|---|---|---|
| 3,029,306 | 4/1962 | Dolby | 360/37 |
| 3,157,738 | 11/1964 | Okamura | 360/10 |
| 3,197,559 | 7/1965 | Kihara | 360/37 |
| 3,662,101 | 5/1972 | Segerstrom | 360/10 |
| 3,845,237 | 10/1974 | Kanakawa | 358/4 |
| 3,869,709 | 3/1975 | Yamagishi | 360/10 |
| 3,893,169 | 7/1975 | Hall | 360/37 |
| 4,120,007 | 10/1978 | Sata | 360/33 |
| 4,148,077 | 4/1979 | Bragas | 360/73 |
| 4,213,143 | 7/1980 | Jones | 358/11 |

Primary Examiner—Vincent P. Canney
Assistant Examiner—Alan Faber
Attorney, Agent, or Firm—Louis Bernat

[57] ABSTRACT

A reproducing apparatus reproduces a video signal of a certain system having a field frequency F1 and a number N1 of horizontal scanning lines within one field period which has been recorded on a magnetic tape travelling at a speed S1 along plurality tracks formed obliquely relative to the longitudinal direction of the tape and mutually parallel, converting the video signal to a video signal of another system having a field frequency F2 and a number N2 of horizontal scanning lines. The reproducing apparatus comprises a means for causing the tape to travel at a speed S2 which is represented by the equation $S2=(F2/F1)S1$, and a means for causing the rotary heads to trace each track on the travelling magnetic tape thereby utilizing a signal over tracing range of a length $l2$ substantially as a reproduced signal corresponding to unit field amount, the length $l2$ being represented by the equation $l2=(N2/N1)l1$, wherein $l1$ is the length of the recording track corresponding to unit field amount of the recorded signal on the magnetic tape.

12 Claims, 53 Drawing Figures

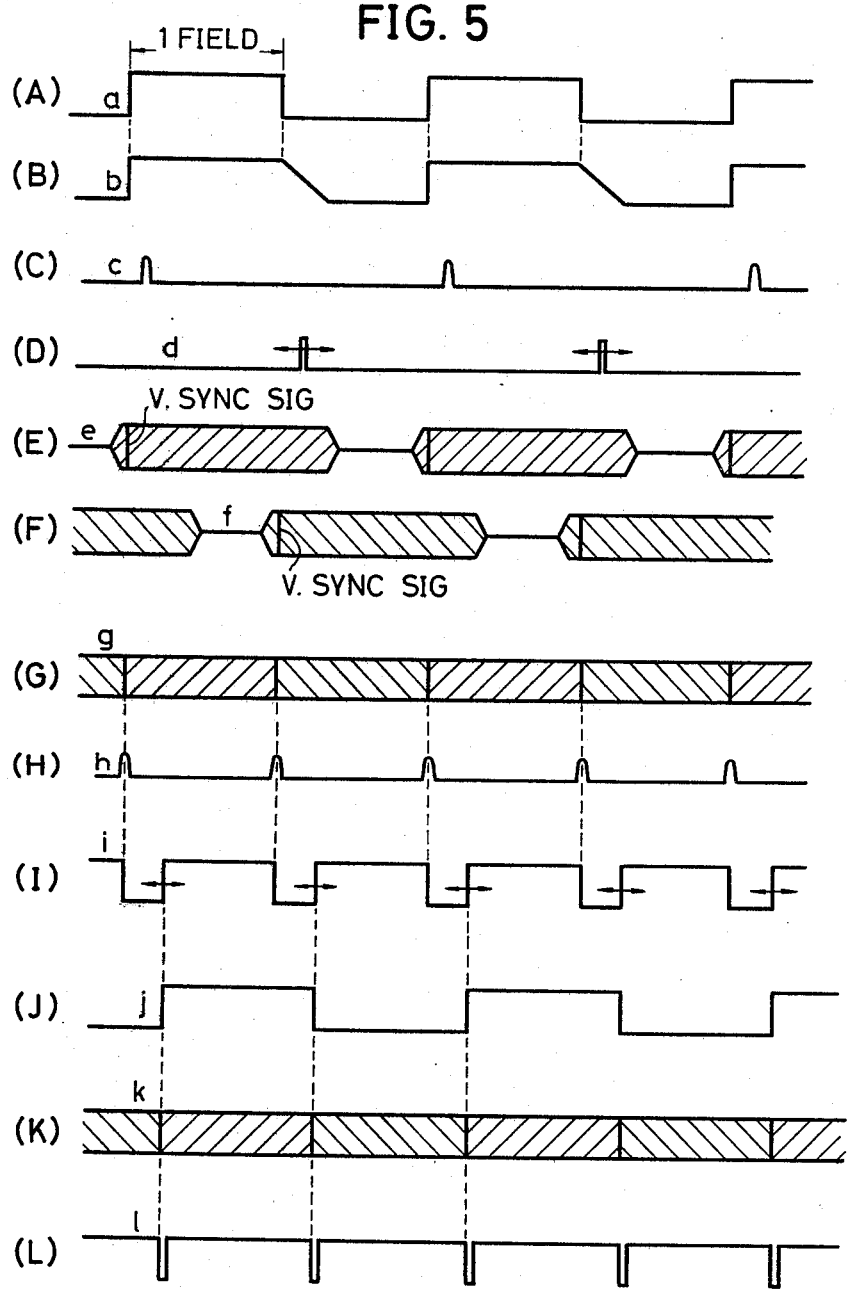

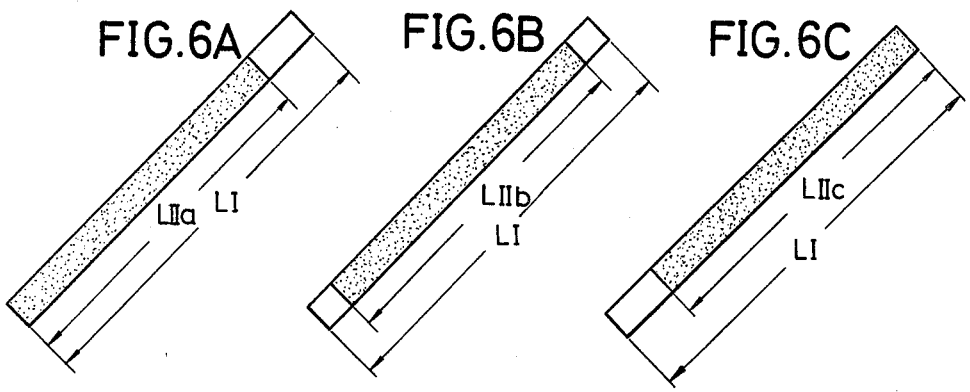
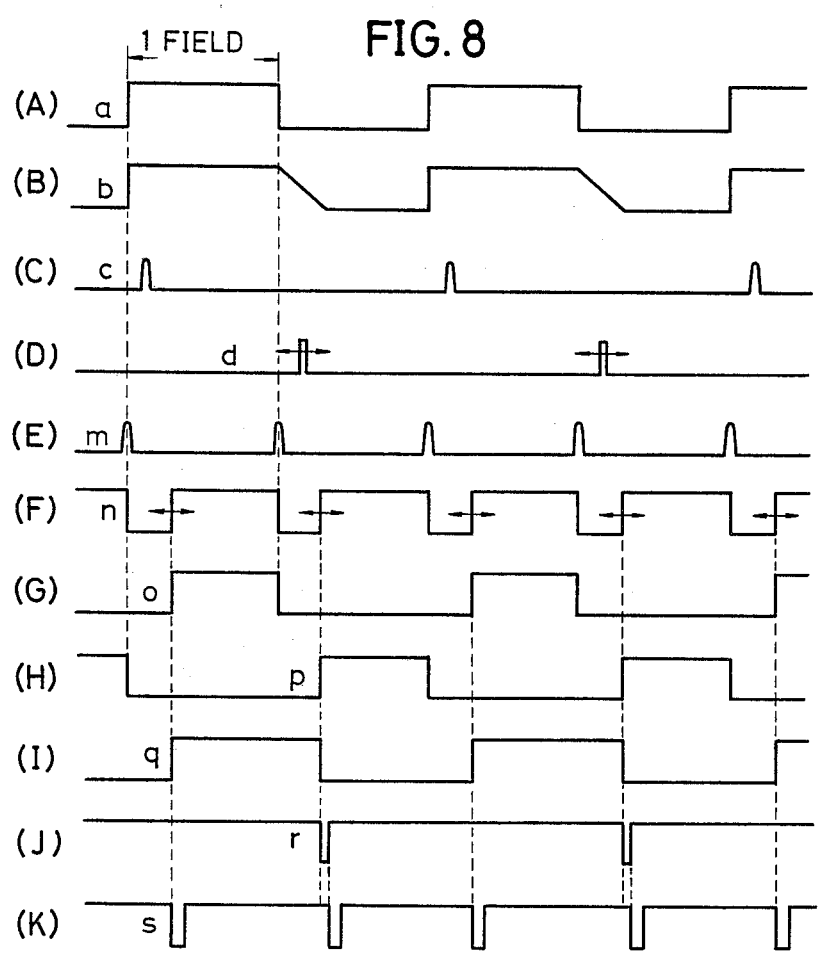

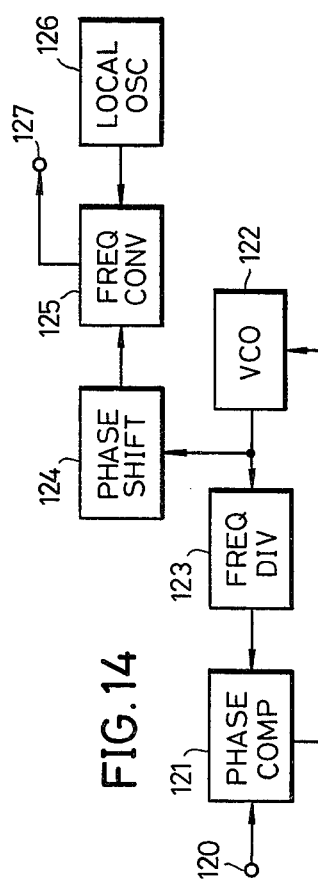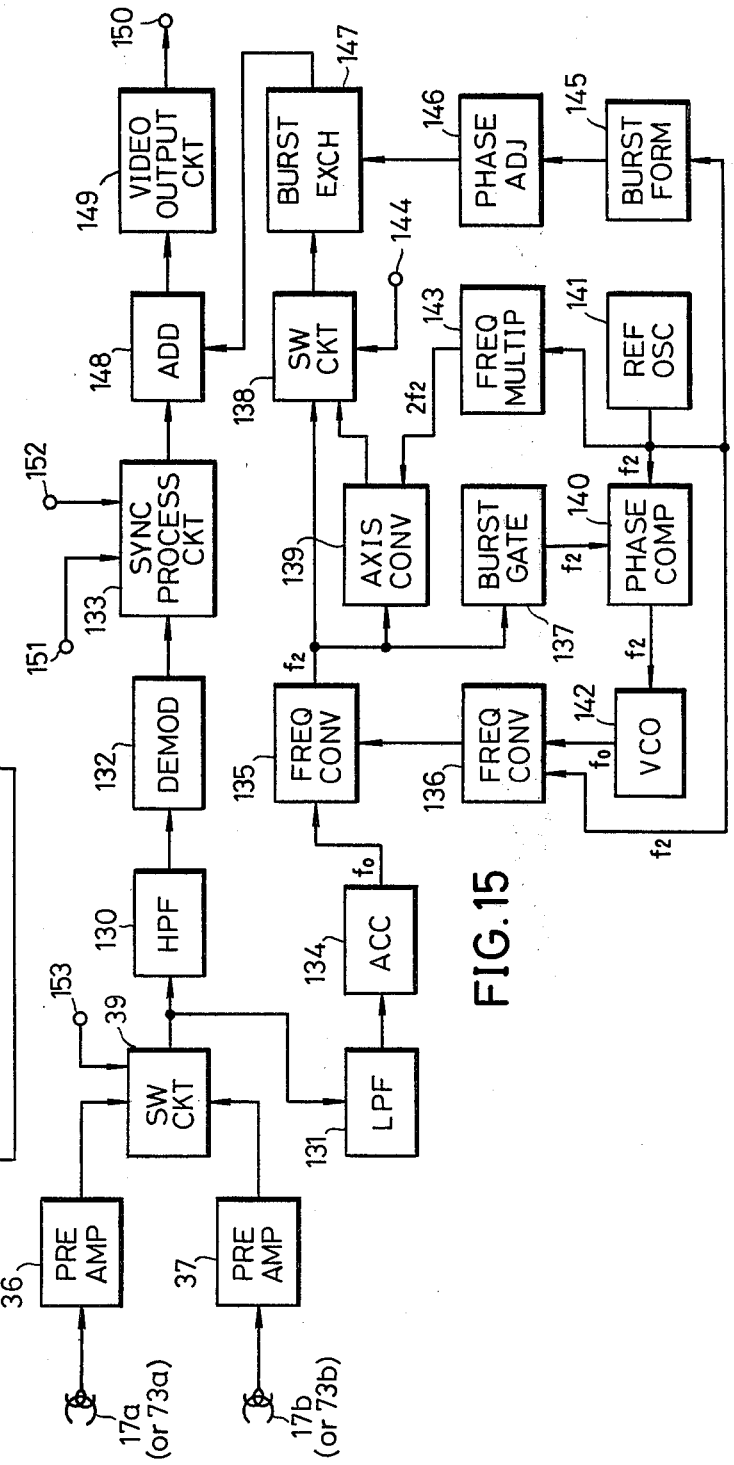
FIG.14
FIG.15

APPARATUS FOR REPRODUCING A VIDEO SIGNAL OF ONE SYSTEM WITH CONVERSION TO A VIDEO SIGNAL OF ANOTHER SYSTEM

BACKGROUND OF THE INVENTION

The present invention relates generally to apparatuses for reproducing a video signal of a certain system recorded on a magnetic tape as a video signal of a different system. More specifically, the invention relates to an apparatus for reproducing a video signal recorded on a magnetic tape as a video signal of one out of a plurality of different systems which are classified according to difference in the field frequency and the number of horizontal scanning lines as a video signal substantially of another system.

At present, there are two principal video signal systems for television. One system, used in the United States, Japan, and other countries (hereinafter referred to as the "first standard system" or the "first system") is based on a field frequency of 60 Hz (precisely speaking, 59.94 Hz in the case of a color video signal) with a number of horizontal scanning lines of 262.5 lines within one field. The other system, used in Europe and other areas (hereinafter referred to as the "second standard system" or the "second system") is based on a field frequency of 50 Hz with 312.5 horizontal scanning lines within one field. There are various other systems such as those of combinations of field frequencies and numbers of horizontal scanning lines within one field of 50 Hz and 202.5 lines and 50 Hz and 409.5 lines. However, with the full-scale spread of color telecasting, the trend of intensification is toward the above mentioned first and second standard systems.

As is known, video signal systems can be further classified by the mode of transmission of the chrominance signal as the NTSC system, the PAL system, and the SECAM system in addition to the above described classification based on differences in field frequency and number of horizontal scanning lines within one field. With respect to this difference in mode of transmission of the chrominance signal, mutual conversion can be carried out with relative ease by an electrical process.

However, so-called system conversion, wherein field frequency and number of horizontal scanning lines within one field are converted, has heretofore required very complicated and elaborate apparatus. More specifically, the necessity for so-called system conversion, wherein field frequency and number of horizontal scanning lines are converted, has heretofore been primarily a problem mutually between telecasting stations or networks as in international relay telecasting between different regions (for example, between Europe and the United States). For this reason, it has been necessary to carry out this system conversion in a manner to meet very strict standards. Consequently, elaborate and large-scale electronic conversion apparatuses have been employed.

In an advanced electronic conversion apparatus being used at present, a system by which a video signal is once converted into a digital signal, which is then stored in a digital memory of large capacity, subsequently read out in a required sequence, and restored into the original video signal is used. By manipulating the time ratio of this signal storing and reading out, conversion of field frequency and number of horizontal scanning lines is accomplished. This electronic conversion apparatus, however, is disadvantageously elaborate and expensive.

Prior to the completion of electronic conversion apparatuses of this character, a number of other apparatuses has been devised and reduced to practice. In a most simple apparatus, the picture due to one video signal system is formed on the screen of a cathode-ray tube and optically picked up by the television camera of the system of another second video signal, which second video signal is thereby obtained.

In another system which has been devised, a video signal magnetically tape recording and reproducing apparatus (hereinafter referred to as VTR) is utilized to carry out repeated recording and reproducing, and by staggering the time-axis relationship between recording and reproducing, system conversion is accomplished. This system, however, has been accompanied by the following problems. In this system, conversions of field frequency and of the number of horizontal scanning lines are carried out separately, and a system conversion is carried out by providing three kinds of VTRs according to purpose, and recording and reproducing are repeated three times. Consequently, this system requires an elaborate and large-scale apparatus. Moreover, since magnetic recording and reproducing are newly repeated three times especially for system conversion, the signal to noise ratio and frequency characteristic of the video signal deteriorate remarkably.

SUMMARY OF THE INVENTION

Accordingly, it is a general object of the present invention to provide a novel and useful apparatus for conversion and reproduction of video signal systems in which apparatus the above described problems are solved.

Another object of the invention is to provide a video signal system conversion and reproduction apparatus of simple organization capable of reproducing a video signal of a first system recorded on a magnetic tape as a video signal of another system of a field frequency and number of horizontal scanning lines different from those of the first system.

Still another object of the invention is to provide a color video signal system conversion and reproduction apparatus of a simple organization capable of reproducing a color video signal of a first system recorded on a magnetic tape as a color video signal of a second system of a field frequency, number of horizontal scanning lines, and chrominance signal transmission mode all differing from those of the first system.

Other objects and further features of the present invention will be apparent from the following detailed description with respect to preferred embodiments of the invention when read in conjunction with the accompanying drawings.

BRIEF DESCRIPTION OF THE DRAWINGS

In the drawings:

FIG. 5(A) through FIG. 5(L) are waveforms of the signals at various parts in the block diagram in FIG. 4;

FIGS. 6A, 6B, and 6C are diagrams respectively for a description of examples of the utilizing range over the tracks for reproduction, in the first embodiment of the reproduction apparatus of the present invention;

FIG. 8(A) through FIG. 8(K) are waveforms of the signals at various parts in the block diagram in FIG. 7;

FIG. 14 is a block diagram showing, in part, a modification of the block diagram indicated in FIG. 13;

FIG. 15 is a block diagram of the fourth embodiment of the video signal system-conversion and reproduction apparatus according to the present invention.

DETAILED DESCRIPTION

The invention relates to magnetic tape recording and reproducing apparatus wherein the tape is transported by conventional means. More particularly, as shown in plan view (FIGS. 3 and 10), the tape 10 is pulled between a capstan C and a pinch wheel P, engaging opposite sides of the tape. The capstan is driven by a motor M to impart motion to the tape. When the motor M rotates the capstan C, the tape 10 moves from left to right, as viewed in FIGS. 3 and 10.

Figure 1:
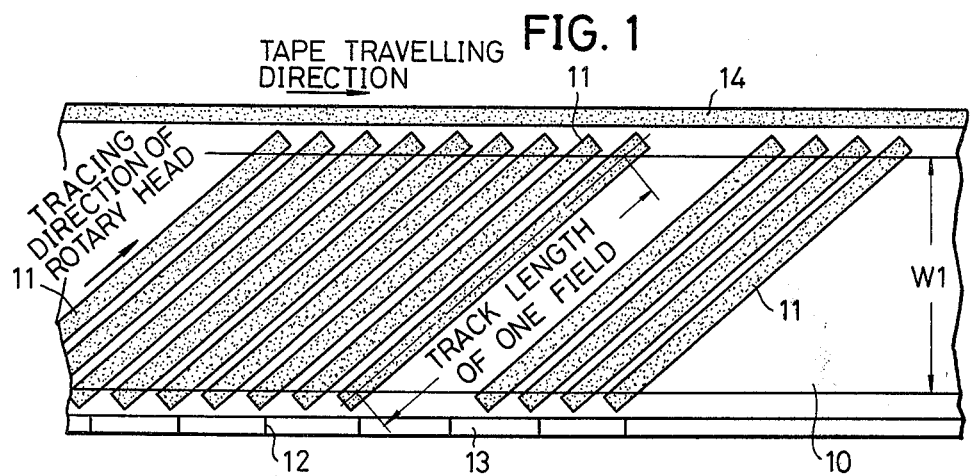
FIG. 1 is a diagram showing a track pattern of a magnetic tape on which a video signal has been recorded.

FIG. 1 shows one example of a track pattern on a magnetic tape at the time of recording of a video signal and an audio signal by means of a VTR of a helical scanning system of a two-head type. On a magnetic tape 10, a video signal is successively recorded, alternately by two rotary heads (not shown), with one field as a unit along parallel tracks 11 which are obliquely disposed in the tape longitudinal direction. At the upper end part of one of these video signal recording tracks 11 and at the lower end part of the succeeding track, the same video information is ordinarily recorded at the same time by different rotary heads. A control signal 12 of a pulsive form is recorded by a control magnetic head (not shown) at and along the lower lateral edge part of the tape in correspondence with the video signal recording tracks 11, whereby a control track 13 is formed. An audio signal is recorded by an audio magnetic head (not shown) along an audio track 14 at and along the opposite (upper) lateral edge part.

In the case where this magnetic tape 10 having a recorded track pattern as described above is reproduced at a tape travelling speed differing from that at the time of recording, the number of reproduced tracks per unit time changes in accordance with the ratio of these tape travelling speeds. For example, when a magnetic tape which has been recorded at a rate of 50 tracks per unit time is reproduced at a tape travelling speed which is 6/5 times that at the time of recording, the number of tracks reproduced per unit time becomes 60 tracks. In addition, the repetitive frequency of the control pulses reproduced at this time from the control track 13 becomes 6/5 times that at the time of recording.

Accordingly, when the video signal recording tracks 11 corresponding to the reproduced control pulses are successively scanned by the rotary heads, a picture of a field frequency which is different from that at the time of recording is obtained at the time of reproduction, whereby conversion of field frequency is accomplished.

The number of horizontal scanning lines contained in a single recording track in which a part of the video signal corresponding to one field is recorded differs depending on the kind of its video signal system, as mentioned hereinbefore. If a track part of an extent which is shorter (or longer) than one recording track is utilized at the time of reproduction as one field, the number of horizontal scanning lines within one field will depend on the proportion of the length of the recording track thus utilized. Therefore, by reproducing that portion of a video signal recording track 11 corresponding to one field with a length differing from that track length, thereby to utilize it as one field portion, conversion of the number of horizontal scanning lines is accomplished.

Here, however, there arise a first case where the number of horizontal scanning lines of one recorded video signal recording track 11 is less than and a second case where it is greater than the number of horizontal scanning lines necessary at the time of reproduction. In the first case where it is greater, the problem may be solved by not utilizing a part of the horizontal scanning lines of the video signal recording tracks 11. In the second case where it is less, however, the rotary heads will scan over a length greater than the length of one video signal recording track 11 as described hereinafter. As a consequence, when a magnetic tape 10 on which these video signal recording tracks 11 have not been formed is scanned, a deficiency of the reproduced signals arises. For this reason, some electrical correction means is used as described hereinafter.

The operation of conversion of field frequency and number of horizontal scanning lines of the apparatus of the present invention will now be described with respect to the case, as an example, where a magnetic tape 10 having a track pattern as shown in FIG. 1 is reproduced. It will be supposed, as one example, that, in the video signal recording tracks 11 shown in FIG. 1, a video signal of the aforementioned second standard system of a field frequency of 50 Hz and 312.5 horizontal scanning lines within one field is recorded, and that the tape travelling speed at the time of recording is S1.

The case where this magnetic tape is reproduced by converting the video signal recorded thereon into one of a first standard system as mentioned hereinbefore of a field frequency of 60 Hz and 262.5 horizontal scanning lines within one field will now be considered. First, the magnetic tape travelling speed S2 of the reproducing apparatus is selected to be as follows.

$$S2 = (6/5)S1$$

As a result, the number of video signal tracks 11 reproduced per unit time becomes 6/5 times the number of video signal tracks 11 recorded per unit time at the time of recording. Furthermore, the frequency of repetition of the reproduced control signal also becomes 6/5 times that at the time of recording. Accordingly, the rotary heads scan the tracks, being driven by known rotary head servo system for driving rotary heads in synchronism with a control signal. In this connection, since the magnetic tape is driven to travel at the travelling speed of S2, the reproduction of the recorded information becomes 5/6 times the recording time. Accordingly, while a problem arises in the case where there is a necessity of reproducing a recorded video signal with a particularly accurate time relationship therewith, such as case is very rare, and the variation of time is less than 20 percent of the recording time. If this time variation is of this order, there is almost no problem in actual practice.

Figure 2:
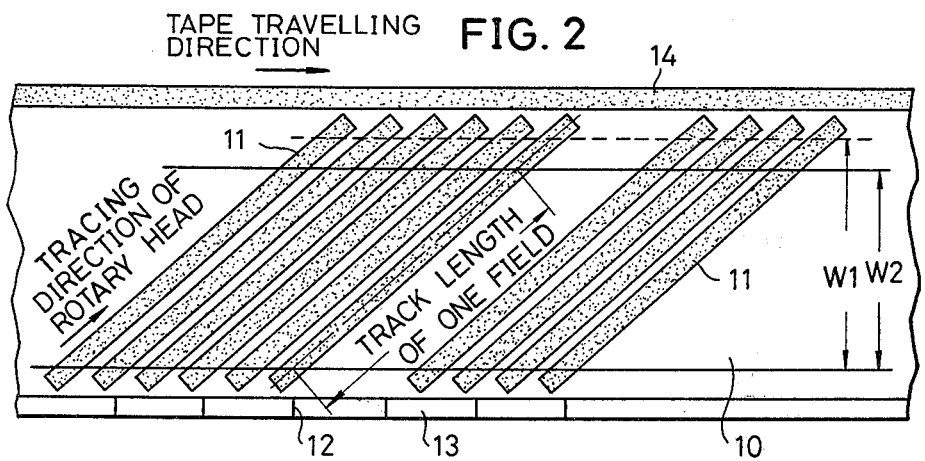
FIG. 2 is a track pattern for a description of scanning range of a head with respect to tracks to be reproduced by a first embodiment of the video signal system-conversion and reproduction apparatus according to the present invention.
Figure 3A:
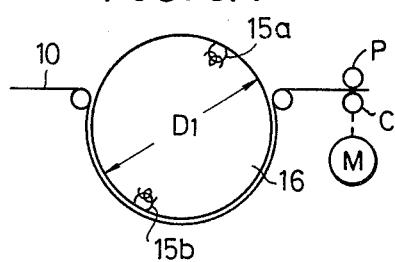
FIGS. 3A and 3B are diagrams for illustrating a diameter of a rotary head drum and a range over which a magnetic tape is wrapped therearound, respectively, in an apparatus for recording and/or reproducing the video signal of the second standard system, and in a first embodiment of the apparatus of the present invention for reproducing the recorded second standard system video signal as the first standard system.
Figure 3B:
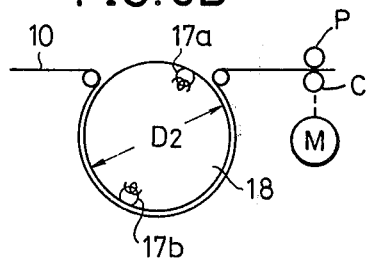

Next, in order to convert the number of horizontal scanning lines within one field to 262.5 lines, the rotational speed of the rotary heads is raised to 6/5 times that at the time of recording, and the diameter D2 of a rotary head drum 18 of a VTR for system-conversion and reproduction shown in FIG. 3B is set at a value which is 262.5/312.5 times the diameter D1 of a rotary head drum 16 of a VTR employed for recording shown in FIG. 3B. At the same time, the angle of inclination of wrapping of the tape around the head drum is so set that the scanning path angle of the rotary heads will be equal to that at the time of recording. For this purpose, the wrap of the magnetic tape 10 around the rotary head drum 18 for reproduction is selected as indicated in FIG. 3B so that it will become equal to the wrap of the magnetic tape 10 around the rotary head 16 for recording as indicated in FIG. 3A. In this case, strictly speaking, the difference between the tape travelling speeds must be considered. But since this difference is very slight, being of the order of 20 percent or less, the above mentioned wrap may be considered for practical purposes to be the wrap around the head 15a, 15b, 17a, and 17b when the rotation of the rotary head is stopped. Accordingly, the width in the transverse direction of the magnetic tape corresponding to the wrap of the magnetic tape 10 of 180 degrees of angle around the head drum is of the dimension indicated by W1 in FIG. 1 at the time of recording, while it becomes short as indicated by W2 in FIG. 2 at the time of reproduction.

Therefore, in a reproducing apparatus which converts a video signal of the second system recorded on a magnetic tape into a video signal of the first system, the modification in mechanism comprises using a rotary head drum of a diameter which is 262.5/312.5 times that at the time of recording, marking the scanning path angles of the rotary heads equal, setting the rotational frequency of the rotary drum of the reproducing apparatus at 6/5 times (30 Hz in the case of a two head type) that of the recording apparatus, and setting the travelling speed of the magnetic tape at 6/5 times that at the time of recording. Since the product of the field frequency and the number of horizontal scanning lines of the first system is very close to that of the second system, the relative linear speeds of the rotary heads at the times of recording and reproducing are almost the same in the case of system conversion of this character, and the frequency of the reproduced signal does not vary from that of the recorded signal. As a result, the organization of the video signal processing system does not become complicated.

In the track pattern illustrated in FIG. 2, the starting points of the scanning of the rotary heads are set at the same positions on the magnetic tape 10 as those in FIG. 1. The purpose of this is that, since recording is so carried out, in general, that the vertical synchronizing signal of the video signal will be positioned immediately after the starting point of scanning, this setting of the starting points makes possible the reproduction and utilization of this recorded vertical synchronizing signal at the time of reproduction. Accordingly, the terminalling end of utilizing one video signal recorded track in this case is not at the terminal end of this track but at the position in front thereof. For this reason, the information of the lower part of the reproduced picture is deficient in comparison with that of the original picture.

This may be avoided by staggering the utilizing range of one field at the time of reproduction and causing the information to be equally deficient in the upper and lower parts of the picture. In this case, since the recorded vertical synchronizing signal cannot be used for the vertical synchronizing signal, it is necessary to generate separately an artificial vertical synchronizing signal and to insert this signal into the reproduced video signal. Furthermore, it is also possible to set the angle of wrap of the magnetic tape around the rotary head drum of the reproducing apparatus at a value of the order of 220 degrees to vary and determine electrically the part of the recording track to be utilized as the scanning track extent of one field at the time of reproduction, and to select at will by manual control the upper information deficiency and the lower information deficiency in response to the information content of the picture.

Figure 4:
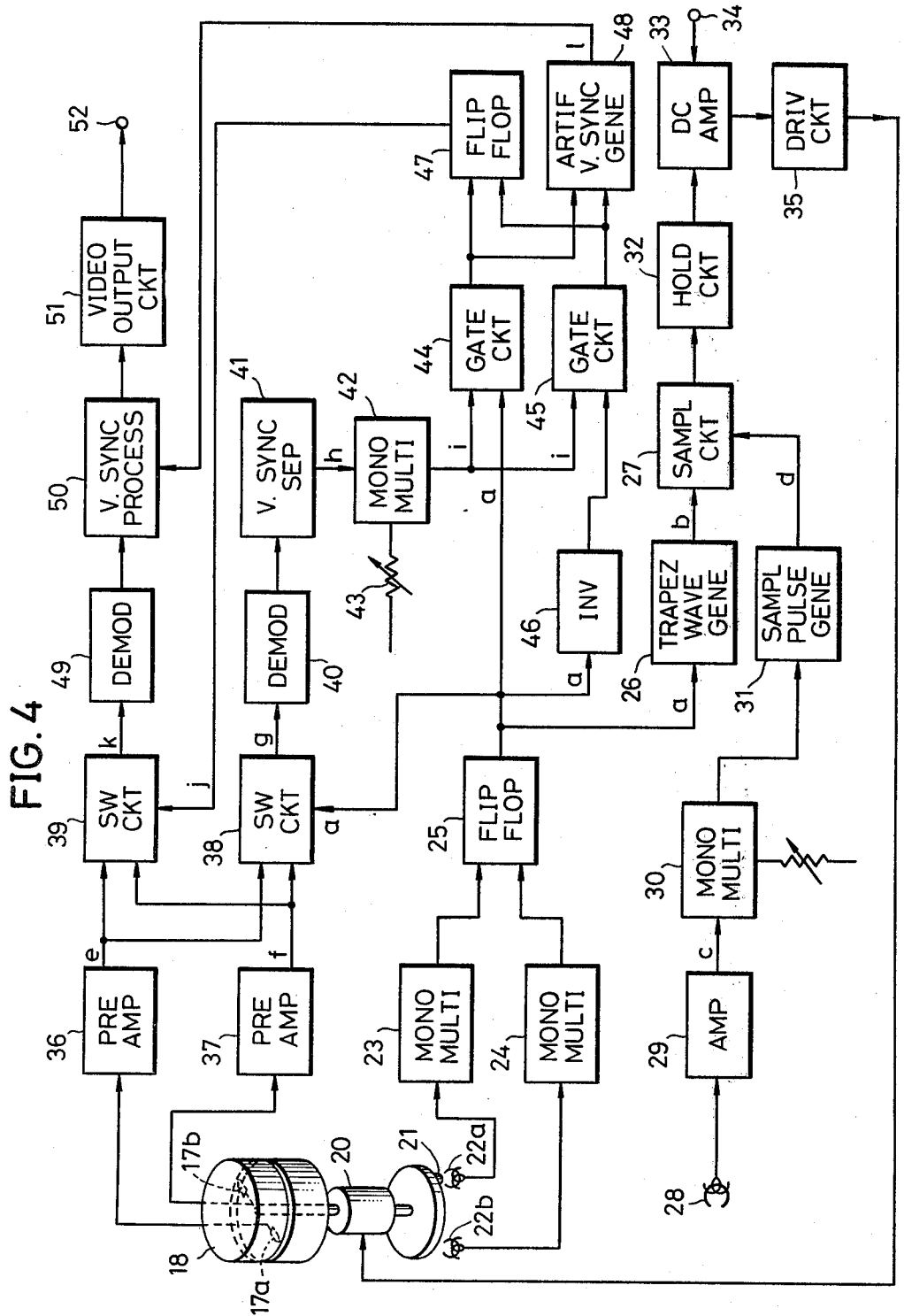
FIG. 4 is a block diagram of the first embodiment of the video signal system-conversion and reproduction apparatus according to the present invention.

Next, a first embodiment of the reproducing apparatus of the present invention capable of practicing the above described system conversion and reproduction will now be described with reference to FIG. 4. First, the rotation control system of the rotary heads will be described. The rotary head drum 18 of the aforementioned diameter D2, on which the rotary heads 17a and 17b are mounted at diametrically opposed positions, is driven by a DC motor 20 to which it is directly coupled. The rotation of the motor 20, that is, the rotation of the drum 18, is detected by two rotation detecting heads 22a and 22b operating cooperatively with a magnet 21 rotated by the motor 20. Each of the rotation detecting heads 22a and 22b produces, as output, one rotation pulse with respect to one revolution of the rotary head drum 18. The rotation pulses thus generated by these rotation detecting heads 22a and 22b are respectively fed to monostable multivibrators 23 and 24, and their respective delay times are adjusted to some extent thereby to correct errors in mounting positions of the rotation detecting heads 22a and 22b. The respective output pulses of the monostable multivibrators 23 and 24 alternately trigger a flip-flop 25. From this flip-flop 25, a symmetrical rectangular wave as indicated in FIG. 5(A) is produced. This rectangular wave a is fed to a trapezoidal wave generating circuit 26 where it is transformed into a trapezoidal wave b as indicated in FIG. 5(B), which is then supplied to a sampling circuit 27.

A control signal is reproduced by a control head 28 from the control track 13 of the magnetic tape 10 travelling at the aforementioned speed S2 and is passed through an amplifier 29, whereupon pulses c as indicated in FIG. 5(C) are sent from the amplifier 29 to a monostable multivibrator 30, whereby the delay time is adjusted. The output signal of the monostable multivibrator 30 is fed to a sampling pulse generating circuit 31, which thereupon produces sampling pulses d as indicated in FIG. 5(D). These sampling pulses d are supplied to the sampling circuit 27 and sample the inclined part of the trapezoidal wave b. The signal thus sampled is sent to a holding circuit 32 where it is rendered into a continuous voltage, which is supplied to a DC amplifier 33. The continuous voltage is combined in the DC amplifier 33 with an output voltage for frequency discrimination of the DC motor 20 introduced through an input terminal 34. The resulting output signal of the DC amplifier 33 is applied through a driving circuit 35 to the DC motor 20.

By the operation of the known head tracking servo system as described above, the rotational phases and speed of the rotary heads 17a and 17b are controlled, and the rotary heads 17a and 17b scan accurately along the video signal recording track.

A video signal of the second system recorded along the recording tracks 11 on the magnetic tape 10 is alternately reproduced by the rotary heads 17a and 17b and supplied respectively to pre-amplifiers 36 and 37. From these pre-amplifiers 36 and 37, respectively, reproduced signals e and f as indicated in FIGS. 5(E) and 5(F) are obtained. As is apparent from FIGS. 3B, 5(E), and 5(F), these reproduced signals e and f have a considerable time period wherein they overlap and exist at the same time. Each of these reproduced signals e and f is supplied to switching circuits 38 and 39.

The switching circuit 38 carries out switching in response to the output signal a of the flip-flop 25 applied thereto as a switching signal. From the switching circuit 38, is obtained a reproduced signal g as indicated in FIG. 5(G) which results from the alternate joining together of the reproduced signals e and f. The vertical synchronizing signal parts within the reproduced signals e and f are always contained in this reproduced signal g. This reproduced signal g is demodulated by a demodulation circuit 40, thereby being restored into a video signal, and thereafter is supplied to a vertical synchronizing signal separation circuit 41, where a vertical synchronizing signal h as indicated in FIG. 5(H) is separated therefrom and led out as output. This vertical synchronizing signal h is supplied to and triggers a monostable multivibrator 42.

As a consequence, the monostable multivibrator 42 produces, as output, pulses i as indicated in FIG. 5(I). Here, the time constant of the monostable multivibrator 42 can be varied by a variable resistor 43. For this reason, by adjusting the variable resistor 43, the delay time is varied, and the rising part of each pulse i is varied.

These pulses i are subjected to logic product operation with the output rectangular wave a of the flip-flop 25 by a gate circuit 44. At the same time, these pulses i are subjected to logical product operation by a gate circuit 45 with a rectangular wave obtain by inverting the polarity of the above mentioned rectangular wave a in an inversion circuit 46. Each of the output signals of the gate circuits 44 and 45 are respectively supplied to a flip-flop 47 and to a circuit 48 for generating an artificial vertical synchronizing signal. In response, the flip-flop 47 produces, as output, a rectangular wave j as indicated in FIG. 5(J). This rectangular wave j is applied as switching pulses to the aforementioned switching circuit 39. As a consequence, the switching circuit 39 produces, as output, a reproduced signal k of a continuous waveform resulting from the joining together alternately of the reproduced signals e and f as indicated in FIG. 5(K). This reproduced signal k contains no vertical synchronizing signal component.

This reproduced signal k is demodulated by a demodulation circuit 49 to become the original video signal, which then is supplied to a vertical synchronizing signal processing circuit 50, where an artificial vertical synchronizing signal l as indicated in FIG. 5(L) generated by the above mentioned artificial vertical synchronizing signal generating circuit 48 is inserted into the demodulated video signal. The output signal of the vertical synchronizing signal processing circuit 50 is supplied to a video signal output circuit 51, where it is subjected to processing such as that for a color signal and is thereafter led out through an output terminal 52. The output signal thus obtained through the output terminal 52 is a video signal whose field frequency and number of horizontal scanning lines have been converted into those of the first system as described hereinbefore.

Then, when the variable resistor 43 is adjusted, the delay time constant of the monostable multivibrator 42 is varied as mentioned hereinbefore, and the position of the rising part of the signal i is varied. As a consequence, the position of the joining point of the reproduced signals e and f for the purpose of obtaining the signal k as indicated in FIG. 5(K) is varied, and of the two reproduced signals e and f, the portions thereof which are utilized for obtaining the signal k is varied. This can be indicated with respect to a track as shown in FIGS. 6A, 6B, and 6C. In these figures, the designation $L_{II}$ denotes the length of the recording track of one field of a video signal of the second system recorded on the magnetic tape 10, while the designations $L_Ia$, $L_Ib$, and $L_Ic$ respectively denote the lengths of the signal portions that are utilized as those for one field of the reproduced video signal of the first system. These FIGS. 6A, 6B, and 6C respectively indicate the cases wherein the delay time constant of the monostable multivibrator is small, medium, and large. In the cases of the FIGS. 6A, 6B, and 6C, respectively, signal deficiency portions occur in the lower part, in the upper and lower parts, and in the upper part of the reproduced picture. However, even if these signal deficiency portions exist, they are insignificant when viewed in comparison with the entire effective picture information and, therefore, present no problem in actual practice.

In the present embodiment of the invention, since the artificial vertical synchronizing signal is obtained on the basis of the recorded vertical synchronizing signal, particularly an interlace relationship can be correctly maintained.

Figure 7:
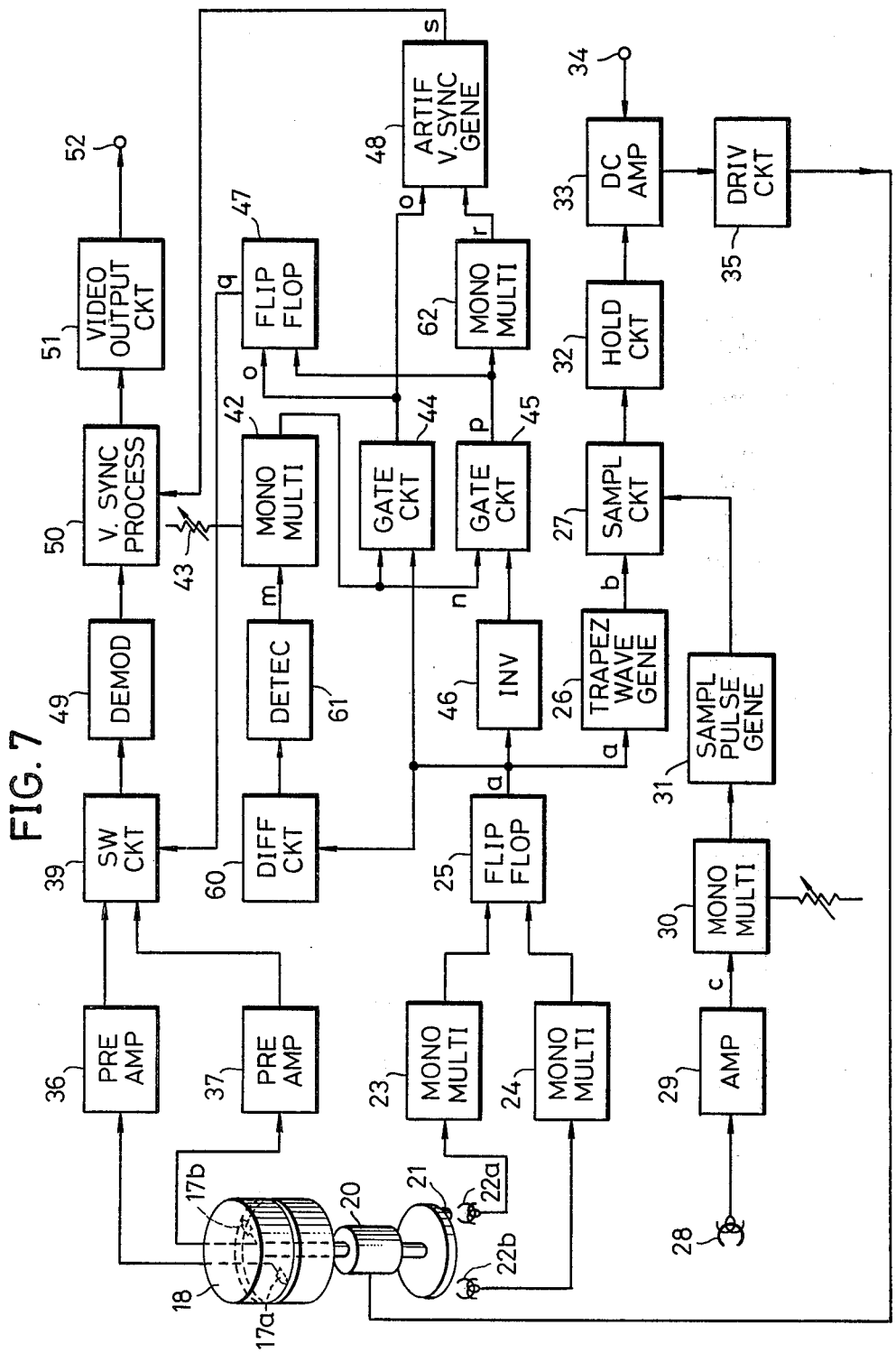
FIG. 7 is a block diagram of a second embodiment of the video signal system-conversion and reproduction apparatus according to the present invention.

Next, a second embodiment of the reproducing apparatus of the invention will be described in conjunction with FIG. 7. In FIG. 7, those parts which are the same as or equivalent to corresponding parts in FIG. 4 are designated by like reference numerals and will not be described again in detail. A rectangular wave a as indicated in FIG. 8(A) obtained from the flip-flop 25 is differentiated by a differentiation circuit 60. Differentiated pulses of positive plurality and of negative polarity which are generated at the rising and falling times of this rectangular wave a are fed to a full-wave detection circuit 61. This full-wave detection circuit 61 thereupon produces, as output, pulses m of either one polarity (positive polarity in this case) as indicated in FIG. 8(E) with a phase relationship corresponding respectively to the rising points and the falling points of the output rectangular wave a of the flip-flop 25. These pulses m are applied to the monostable multivibrator 42.

The delay time constant of this monostable multivibrator 42 is varied and controlled by the variable resistor 43, and, as a result, the information deficient part of the picture is adjusted similarly as in the preceding embodiment of the invention. This monostable multivibrator 42 produces, as output, delayed pulses n as indicated in FIG. 8(F), which are simultaneously supplied respectively to the gate circuits 44 and 45.

The gate circuit 44 obtains the logical product of these pulses n and the output rectangular wave a of the flip-flop 25 to produce, as output, pulses o as indicated in FIG. 8(G), which are fed respectively to the flip-flop 47 and the artificial vertical synchronizing signal generating circuit 48. The gate circuit 45 obtains the logical product of the pulses n and the output pulses of the inversion circuit 46 to produce, as output, pulses p as indicated in FIG. 8(H), which are fed respectively to the flip-flop 47 and a monostable multivibrator 62. The flip-flop 47 is adapted to be triggered by the rising parts of the input pulses o and p. As a consequence, this flip-flop 47 generates a rectangular wave q as indicated in FIG. 8(I), which is applied as switching pulses to the switching circuit 39. This rectangular wave q is equal to a wave which is obtained when the rectangular wave a is delayed by the delay time of the monostable multivibrator 42.

For the sake of causing the odd-number fields and the even-number fields to be interlaced, the monostable multivibrator 62 delays the input pulses p by a time which is ½ of the horizontal scanning time and produces, as output, pulses r as indicated in FIG. 8(J), which are fed to the artificial vertical synchronizing signal generating circuit 48. The artificial vertical synchronizing signal generating circuit 48 produces, as output, pulses s of a constant width from the instants of rises of the input pulses o and r as indicated in FIG. 8(K). These pulses s are introduced as the artificial vertical synchronizing signal into the vertical synchronizing signal processing circuit 50, where it is superimposed on the reproduced demodulated video signal from the demodulation circuit 49.

Next, an embodiment of the invention for reproducing a video signal of the first system recorded on a magnetic tape with converting the same into a video signal of the second system will be described.

It will be supposed that the magnetic tape 10 shown in FIG. 1 was being driven at a travelling speed S3 at the time of recording of a video signal of the first system thereon. In the present embodiment of the invention, the magnetic tape travelling speed S4 of the reproducing apparatus is selected to be as follows.

$$S4 = (5/6)S3$$

Figure 9:
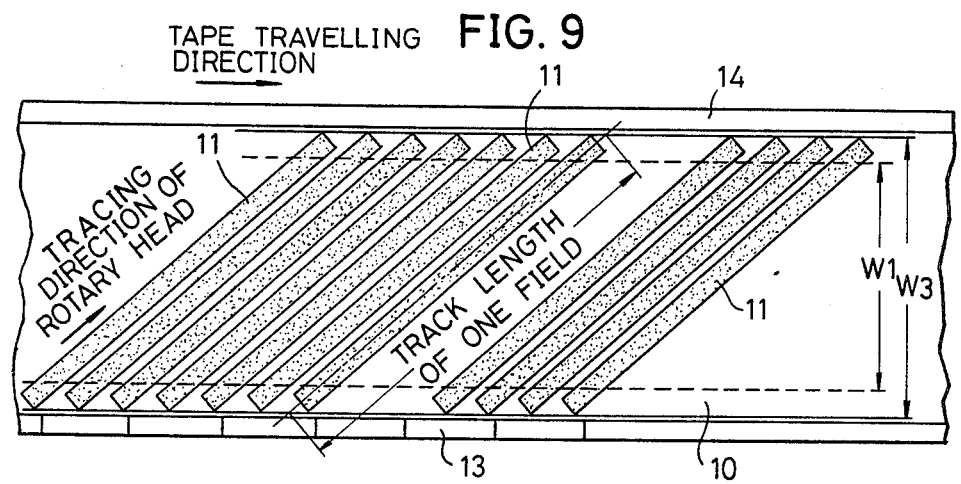
FIG. 9 is a track pattern for a description of utilizing range of the tracks to be reproduced by a third embodiment of the apparatus of the present invention.
Figure 10A:
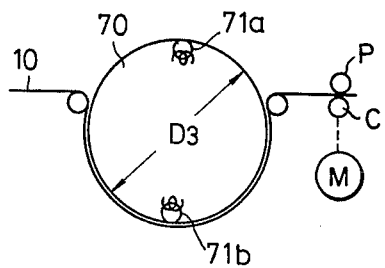
FIGS. 10A and 10B are diagrams for illustrating a diameter of a rotary head drum and a range over which a magnetic tape is wrapped therearound, respectively, in an apparatus for recording and/or reproducing the video signal of the first standard system, and in a third embodiment of the apparatus of the present invention for reproducing the recorded first standard system video signal as the second standard system.
Figure 10B:
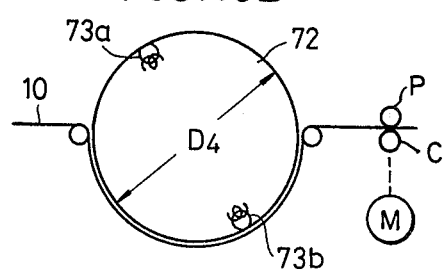

Furthermore, in order to convert the number of horizontal scanning lines within one field to 312.5 lines, the diameter D4 of the rotary head drum 72 provided with rotary heads 71a and 71b of the reproducing apparatus as shown in FIG. 10B is made to be 312.5/262.5 times the diameter D3 of the rotary head drum 70 provided with rotary heads 73a and 73b of the recording apparatus as shown in FIG. 10A. In addition, the wrap (length) of the magnetic tape 10 around the rotary head drum 72 is so selected that the tracing path angle of the rotary heads relative to the magnetic tape 10 will be equal to that of the recording apparatus. That is, selection is so made that the magnetic tape 10 is wrapped around the rotary head drum 72 of the reproducing apparatus as indicated in FIG. 10B so as to be equal to the length of the magnetic tape 10 wrapped around the rotary head drum 70 of the recording apparatus shown in FIG. 10A. Accordingly, while the tape width corresponding to a 180-degree wrap of the magnetic tape 10 around the rotary head drum is the width indicated by W1 in FIG. 1 in the recording apparatus, it becomes greater as indicated by width W3 in FIG. 9 in the reproducing apparatus.

For the rotary heads 73a and 73b of the reproducing apparatus to trace the track shown in FIG. 9, their rotational speed is set at 5/6 times (25 Hz in the case of the two head type) that at the time of recording. As a result, the rotary heads 73a and 73b trace accurately along the recording tracks 11 in correspondence with the reproduction control signal.

In the track pattern illustrated in FIG. 9, the track length of one field at the time of reproduction becomes greater than the track length at the time of recording. Therefore, at the time of reproduction, there occurs a deficiency of the reproduced signal in the vicinity of the start and in the vicinity of the ending of the tracing a recording track. In the case where, in mutually adjacent recording tracks, those portions on which the same information part of the video signal is recorded are short, this deficiency period becomes long. For this reason, it is desirable to suppress noise and the like arising as a result and, at the same time, to supplement the horizontal synchronizing signal.

Furthermore, when the vertical synchronizing signal recorded on the magnetic tape 10 is utilized at the time of reproduction, in a television receiver, a period of deficient information appears in the lower part of the reproduced picture. Accordingly, equal deficiency periods in the upper and lower parts of the picture can be caused to appear by inserting an effective artificial vertical synchronizing signal at a point before the vertical synchronizing signal is to be reproduced.

Figure 11:
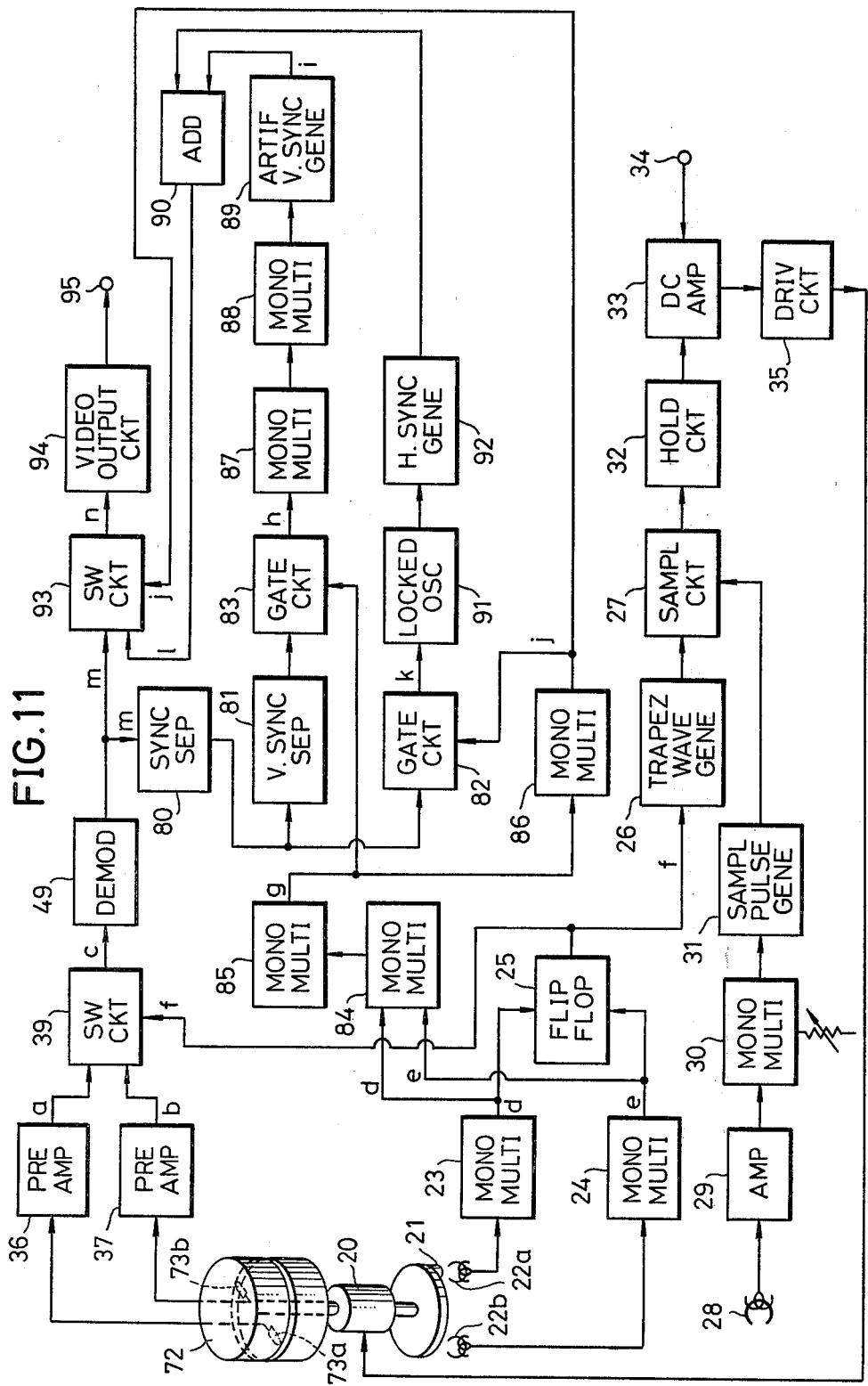
FIG. 11 is a block diagram of the third embodiment of the video signal system-conversion and reproduction apparatus according to the present invention.

A third embodiment of the apparatus of the invention for conversion from the first system into the second system and reproduction will now be described with reference to FIG. 11. In FIG. 11, those parts which are the same as or equivalent to corresponding parts in FIGS. 4 are designated by like reference numerals. Detailed description of such parts will be omitted. In the reproduced signals a and b reproduced respectively by the rotary heads 73a and 73b and passed through the pre-amplifiers 36 and 37, vertical synchronizing signal parts VS are included respectively at two places corresponding to the scanning of the rotary heads 73a and 73b in some instances as indicated in FIGS. 12(A) and 12(B).

Figure 12:
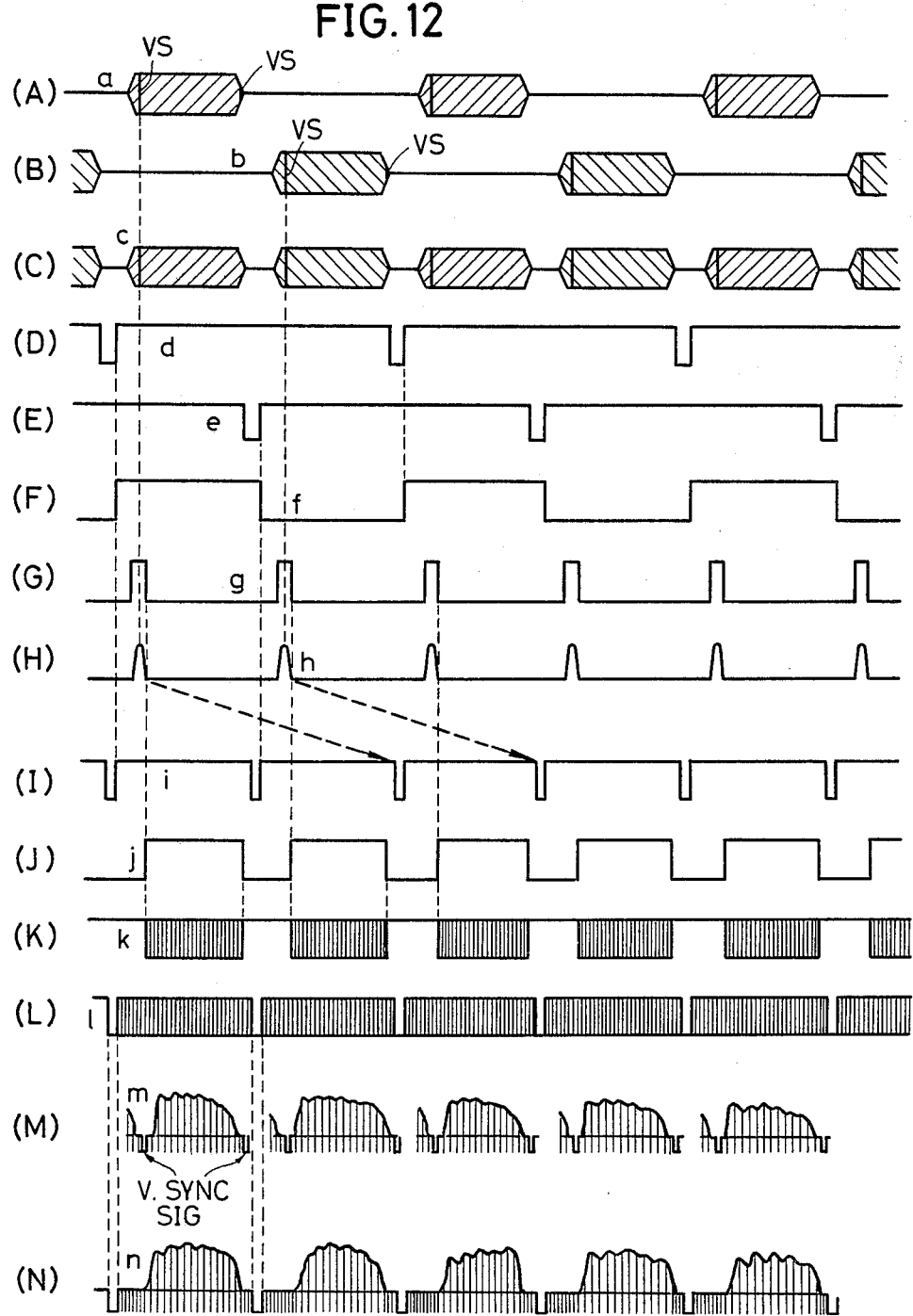
FIG. 12(A) through FIG. 12(N) are waveforms of signals at various parts in the block diagram in FIG. 11.

Furthermore, the monostable multivibrators 23 and 24 respectively produce, as outputs, pulses d and e as indicated in FIGS. 12(D) and 13(E). Consequently, the flip-flop 25 produces, as output, pulses f as indicated in FIG. 12(F). These pulses f are applied as switching pulses to the switching circuit 39, which thereupon produces, as output, a reproduced signal c resulting from the alternate joining together of the reproduced signals a and b as indicated in FIG. 12(C). This reproduced signal c is demodulated by the demodulation circuit 49 and thereby restored into the original video signal. This reproduced video signal of the demodulation circuit 49 includes a signal-deficient period (noise being generated by this period) and a vertical synchronizing signal (there being two at the time of reproduction in some cases as a result of recording overlap) as indicated by the wave m in FIG. 12(M).

This reproduced video signal m is supplied to a synchronizing signal separation circuit 80, where a horizontal and vertical combined synchronizing signal is separated and then supplied respectively to a vertical synchronizing signal separation circuit 81 and a gate circuit 82. A vertical synchronizing signal is separated from the combined synchronizing signal by the vertical synchronizing signal separation circuit 81 and is supplied to a gate circuit 83.

The output pulses d and e of the monostable multivibrators 23 and 24 trigger a monostable multivibrator 84, which in turn triggers a monostable multivibrator 85. As a consequence, the monostable multivibrator 85 produces, as output, pulses g of a phase relationship corresponding to the vertical synchronizing signal part of the reproduced signal c as indicated in FIG. 12(G). These pulses g are applied as gate pulses to the above mentioned gate circuit 83 and, at the same time, also to a monostable multivibrator 86, the falling part of these pulses g trigger the monostable multivibrator 86. As a consequence, from the gate circuit 83, only a vertical synchronizing signal h of a specific phase as indicated in FIG. 12(H) is obtained as output each time the rotary head 73a or 73b traces one recording track. This signal h is delayed by a delay time corresponding to a period slightly less than approximately one frame by cascade-connected monostable multivibrators 87 and 88 so that accurate interlacing is effected. The signal h thus delayed is supplied to an artificial vertical synchronizing signal generating circuit 89 and thereby rendered into an artificial vertical synchronizing signal i as indicated in FIG. 12(I). This artificial vertical synchronizing signal i is supplied to an addition circuit 90, where it is added to a horizontal synchronizing signal from a horizontal synchronizing signal generating circuit 92 described hereinafter.

In the gate circuit 82, only the positive side of the combined synchronizing signal supplied thereto from the synchronizing signal separation circuit 80 is passed by gate pulses j indicated in FIG. 12(J) from the aforementioned monostable multivibrator 86. Consequently, the gate circuit 82 produces, as output, a horizontal synchronizing signal k indicated in FIG. 12(K), which is supplied to a locked oscillator 91 containing therewithin an automatic frequency control (AFC). This locked oscillator 91 continues to oscillate with the immediately previous phase even during a period wherein its input horizontal synchronizing signal k is missing. The continuous oscillation output of this locked oscillator 91 is adjusted with respect to its phase, pulse width, etc., in the above mentioned horizontal synchronizing signal generating circuit 92 and rendered into a signal which is equivalent to the horizontal synchronizing signal of the video signal. This signal is supplied to the above mentioned addition circuit 90, where it is added to the artificial vertical synchronizing signal i. The addition circuit 90 thereupon produces, as output, an artificial synchronizing signal l as indicated in FIG. 12(L), which is supplied to a switching circuit 93.

This switching circuit 93 is supplied with the above mentioned pulses j indicated in FIG. 12(J) from the monostable multivibrator 86 as switching pulses and selectively produces, as output, a reproduced demodulated video signal m indicated in FIG. 12(M) from the demodulation circuit 49 in the periods on the positive side of these pulses i and the artificial synchronizing signal l from the addition circuit 90 in the periods on the negative side of these pulses j. As a result, a video signal n indicated in FIG. 12(N) is obtained from the addition circuit 90. The color signal component and the like of this video signal n are processed in a video output circuit 94, whereupon a video signal which has been converted into one of the second system of a field frequency of 50 Hz and 312.5 horizontal scanning lines within one field is led out through an output terminal 95.

As described above, the horizontal synchronizing signal and the artificial vertical synchronizing signal are supplementarily added to the reproduced video signal, and a new video signal n is formed. For this reason, the periods wherein the reproduced signal is missing are supplemented with a horizontal synchronizing signal of continuous phase. Furthermore, by adjusting the position of the artificial vertical synchronizing signal i or adjusting the utilizing length of the recording tracks of one field scanned by the rotary heads 73a and 73b, the distribution of the signal deficient periods equally to the upper and lower parts of the reproduced picture becomes possible.

In the present embodiment of the invention, the artificial vertical synchronizing signal is formed on the basis of the vertical synchronizing signal reproduced from the magnetic tape, but this is for the purpose of correctly maintaining the interlace relationship. In the case where the relationship between the odd-numbered fields and the even-numbered fields and the relationship between the recording tracks at the time of recording are specified, or in the case of an apparatus of simplified type, the artificial vertical synchronizing signal may be formed on the basis of rotation detected pulses. Furthermore, in the periods wherein the reproduced signal is missing, the measure of suppressing noise generated in these periods and inserting a black level signal may be taken instead of inserting the artificial vertical synchronizing signal i synchronized with the rotation of the rotary heads 73a and 73b as described above.

When a video signal is to be reproduced with the number of horizontal scanning lines within one field of a system differing from that of the recorded video signal, the apparatus is not limited to those of the above described embodiments of the invention. The essential requirement is that the relationship $l2=(N2/N1)l1$, where: $l2$ is the tracing path length for one field of the rotary heads at the time of reproduction; $N2$ is the number of horizontal scanning lines within one field of the video signal at the time of reproduction; $N1$ is the number of horizontal scanning lines within one field of the video signal at the time of recording; and $l1$ is the tracing path length for one field of the rotary heads at the time of recording, be valid.

Since the magnetic tape travelling speed at the time of reproduction differs from that at the time of recording, the pitch of the reproduced audio signal differs from the pitch at the time of recording. In the case of the above described embodiments of the invention, the magnetic tape travelling speed at the time of reproduction is 6/5 times or 5/6 times that at the time of recording. Accordingly, the variation in pitch is 20 percent or less, which is of an order which will not give rise to any problems in actual practice. Therefore, the reproduced audio signal may be used as it is without carrying out pitch correction. However, in the case of large variation or in the case where an accurate pitch is required at the time of reproduction, it is desirable to apply a correction for restoring the pitch to that of the originally recorded audio signal. For this correction known techniques employing means such as means utilizing recent digital memories and means utilizing electric charge transfer devices such as bucket-brigade devices (BBD) and charge-coupled devices (CCD) can be used.

Next, a description is given of an embodiment of the reproducing apparatus of the invention for reproducing a color video signal of a system with converting the same to a color video signal of another system.

The color video signal systems are substantially classified into three groups, i.e., NTSC system, PAL system, and SECAM system, with respect to transmitting form of chrominance signal.

A technical point common to these systems is that the chrominance subcarrier is modulated with two kinds of color difference signals, and the resulting carrier chrominance signal is multiplexed with the luminance signal. However, these systems are completely different in the points such as chrominance subcarrier frequency and modulation system.

In general, the helical scanning system VTR often adopts a system wherein the color video signal is divided into the chrominance signal (carrier chrominance signal) and the luminance signal, and then the chrominance signal component thus divided is converted to lower frequency band through frequency conversion, and the luminance signal thus divided is subjected to frequency modulation. Thereafter, the chrominance signal thus frequency converted and the luminance signal thus frequency modulated are added to be recorded on a magnetic tape. On the magnetic tape, the frequency band of the carrier chrominance signal differs from that of the original signal. However, since the carrier chrominance signal has been recorded directly on the magnetic tape, it keeps the characteristic which is the same as that of the original signal.

A fourth embodiment of a system of the present invention described hereinafter is arranged so that, after the carrier chrominance signal which has been converted to the lower frequency band is reproduced from the magnetic tape, the carrier chrominance signal thus reproduced is converted to the carrier chrominance signal of the other system.

Figure 13:
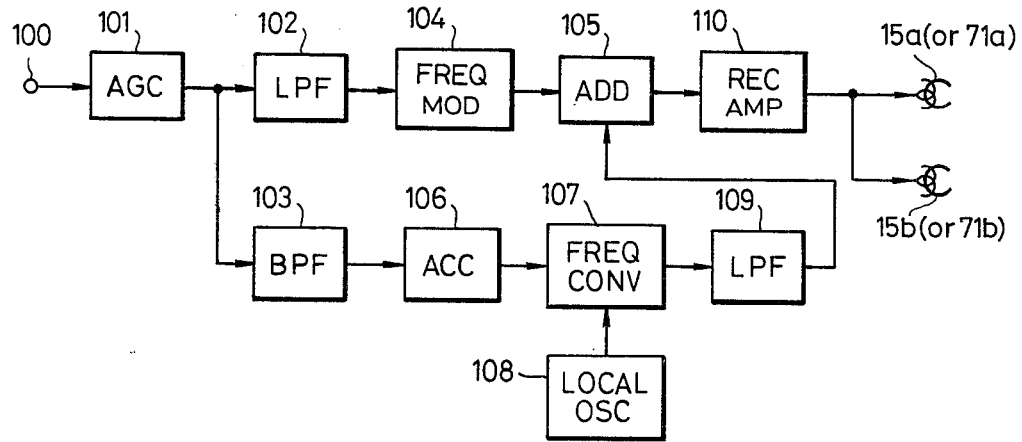
FIG. 13 is a block diagram showing an essential part of a system for recording the color video signal which is to be reproduced by a fourth embodiment of the reproduction apparatus of the present invention.

First, a general recording process of the color video signal is described. FIG. 13 shows a block diagram of one example of a color video signal recording system generally adopted in the helical scanning system VTR.

The color video signal introduced through an input terminal 100 is supplied to an automatic gain control circuit (AGC) 101, where it is subjected to automatic gain control thereby to be corrected its level fluctuation. The resulting signal is supplied respectively to a low-pass filter 102 and a band-pass filter 103. A luminance signal led out from the low-pass filter 102 is subjected to frequency modulation in a frequency modulator 104 which is of a voltage-frequency conversion circuit producing oscillation frequencies depending on amplitude of the luminance signal, and is then fed to an adding circuit 105.

From the band-pass filter 103, is derived the carrier chrominance signal, which has different frequency range depending upon the systems of color video signal, that is, about 3 MHz to 4 MHz for the NTSC system, and about 3.8 MHz to 4.8 MHz for the PAL system or SECAM system. The carrier chrominance signal from the band-pass filter 103 is controlled its amplitude to be constant in an automatic color control circuit (ACC) 106, and is then supplied to a frequency converter 107, where it undergoes frequency conversion with a stable local oscillation frequency generated from a local oscillator 108. Here, the signal which is derived from the frequency converter 107 and passes through a low-pass filter 109 is a signal which has been converted to the lower frequency band which is a difference between the output carrier chrominance signal of the ACC circuit 106 and the local oscillation frequency. This carrier chrominance signal frequency converted to lower band is supplied to the adding circuit 105, where it is added with the above described luminance signal which has been frequency converted. The resulting signal passes through a recording amplifier 110 and is recorded on the magnetic tape 10 by means of the rotary magnetic heads 15a and 15b (or 71a and 71b). The chrominance subcarrier frequency of the above mentioned carrier chrominance signal converted to the lower frequency band is selected to be of the order of 0.7 MHz. That is, the chrominance subcarrier frequency is selected so that a frequency which is twice the above described frequency converted chrominance subcarrier frequency establishes a frequency interleaving relationship, which thereby causes an intermodulation (spurious disturbance) noise generated upon reproduction to be least appeared on a picture screen.

FIG. 14 shows a modification in which a local oscillation frequency for frequency conversion is obtained based on a horizontal synchronizing signal, instead of using the above described local oscillator 108. This arrangement is adopted when eliminating crosstalk interference in the course of color signal processing, particularly in a VTR which is provided with two rotary heads having mutually different azimuths and carries out azimuth recording without margins between mutually adjacent tracks.

To a phase comparator 121 is applied the horizontal synchronizing signal through an input terminal 120, which signal has been separated from the color video signal to be recorded. A voltage controlled oscillator (VCO) 122 undergoes free running oscillation at a frequency which is 40 times that of the horizontal synchronizing signal. The oscillation output is stepped down by 1/40 by a frequency divider 123, and is then fed to the phase comparator 121. The phase comparator 121 carries out phase comparison between these two signals, and the resulting signal controls oscillation frequency of the VCO 122, whereby automatic frequency control (AFC) is carried out.

By means of the above described loop, the oscillation frequency of the VCO 122 becomes exactly 40 times the horizontal scanning frequency. The output of the VCO 122 is supplied to a phase shifter 124, where it is subjected to phase shift by 90 degrees every successive horizontal scanning period, with inverting the phase shifting direction every successive field.

The resulting output signal of the phase shifter 124 is supplied to a frequency converter 125. There, it is frequency converted with a constant frequency signal from the local oscillator 126 to be a signal having a sum frequency of the both signal. The signal thus frequency converted is led out through a terminal 127 and is then supplied to the frequency converter 107 (FIG. 13). Here, through the arrangement wherein the oscillation frequency of the local oscillator 126 is selected to be equal to the chrominance subcarrier frequency of the carrier chrominance signal, the chrominance subcarrier of the carrier chrominance signal which has been converted to lower frequency band at the frequency converter 107 becomes a signal frequency of which is 40 times the horizontal scanning frequency, and which is phase shifted by 90 degrees for every successive horizontal scanning period, with inverting phase shifting directions alternately for every successive field.

Next, a fourth embodiment of the reproducing apparatus of the invention for reproducing a color video signal of a system with converting the same to a color video signal of another system will be described in conjunction with FIG. 15.

The present embodiment is adapted to reproduce the PAL (or NTSC) system color video signal with converting the same to the NTSC (or PAL) system color video signal. The present embodiment relies on the common points that, in both of PAL system and NTSC system, the carrier chrominance signal is obtained by subjecting two color difference signals to quadrature phase modulation.

Referring to FIG. 15, to the switching circuit 39, there are applied through a terminal 153 the switching pulse from the flip-flop 47 (FIG. 4) when the recorded color video signal is of the PAL system, and another switching pulse from the flip-flop 25 (FIG. 11) when the recorded color video signal is of the NTSC system. The reproduced signal derived from the switching circuit 39 is supplied to a high-pass filter 130 from which the frequency modulated luminance signal is thereby derived. Simultaneously, a low-pass filter 131 receives the above described reproduced signal and sends out the carrier chrominance signal which has been frequency converted to lower frequency band.

The reproduced frequency modulated luminance signal from the high-pass filter 130 is demodulated at a demodulator 132, and is then fed to a synchronizing signal processing circuit 133. When the recorded color video signal is of PAL system, the artificial vertical synchronizing signal from the artificial vertical synchronizing signal generating circuit 48 (FIG. 4) is applied through a terminal 151 to the synchronizing signal processing circuit 133, where it is inserted into the reproduced luminance signal whose field frequency and the number of horizontal scanning lines have been converted. On the other hand, when the recorded color video signal is of NTSC system, the signal from the adding circuit 90 (FIG. 11) is applied through the terminal 151 to the synchronizing signal processing circuit 133, and the artificial vertical synchronizing signal obtained by gating only for the negative polarity period of the signal from the monostable multivibrator 86 (FIG. 11) is applied to a terminal 152 and is inserted into the reproduced luminance signal.

The resulting reproduced carrier chrominance signal with converted to lower frequency band, sent out from the low-pass filter 131, is controlled it amplitude to be constant by an ACC circuit 134, and is then supplied to a frequency converter 135. There, it is frequency converted with a signal for frequency conversion which is supplied from a frequency converter 135 described hereinafter through a band-pass filter (not shown) thereby to be a carrier chrominance signal having a chrominance subcarrier frequency (i.e., a frequency of the color burst signal) of f2. A value of the frequency f2 is selected to be 3.58 MHz which is equal to the chrominance subcarrier frequency of the NTSC system, when the recorded color video signal is of PAL system, or selected to be 4.43 MHz which is equal to the chrominance subcarrier frequency of the PAL system, when the recorded color video signal is of the NTSC system. The reproduced carrier chrominance signal is supplied respectively through a band-pass filter (not shown) to a burst gate circuit 137, a switching circuit 138, and an axis inversion circuit 139.

The color burst signal gated by the burst gate circuit 137 is fed to a phase comparator 140, where it undergoes phase comparison with a signal having a frequency f2 and generated from a reference oscillator 141. The resulting output error voltage of the phase comparator 140 is fed to a VCO 142 and serves to control the oscillation frequency thereof so as to synchronize with the reproduced color burst signal. Here, the oscillation center frequency of the VCO 142 coincides with the chrominance subcarrier frequency fo of the reproduced carrier chrominance signal which has been frequency converted to the lower band. This is because of that the relative linear speed between the tape and the head at the time of reproduction is caused to differ from that at the time of recording, for the purpose of converting the field frequency and the number of horizontal scanning lines as described above. The VCO 142 operates so as to correct the above described difference automatically.

The resulting output signal of the VCO 142 is frequency converted with the signal of a frequency f2 from the reference signal oscillator 141 at the frequency converter 136. The frequency converter 136 is adapted to send out a signal having a frequency which is the sum of frequencies of the signals supplied thereto. The signal thus sent out is supplied as a signal for frequency conversion to the frequency converter 135. By means of the automatic phase control (APC) loop of the above arrangement, the reproduced carrier chrominance signal sent out from the frequency converter 135 becomes the signal wherein the chrominance subcarrier is f2, the time axis variation error at the time of reproduction is removed, and the phase of the color burst coincides with the phase of the output signal of the reference oscillator 141.

The reproduced carrier chrominance signal is frequency converted in the axis inversion circuit 139 with a signal from a double multiplying circuit 143 which has a frequency obtained by multiplying double the frequency f2 of the output reference signal of the reference oscillator 141. Accordingly, the frequency converted signal has a frequency of f2. Further, the upper side band and lower side band of the frequency converted signal have been inverted, whereby the U-axis phase of the color burst signal is inverted about a V-axis thereby axis inversion being carried out.

The resulting axis inverted signal is supplied to the switching circuit 138. Here, it is necessary that the phase of the signal for axis inversion having a frequency 2f2 is adjusted so that the phase of the axis inverted color burst signal in the reproduced carrier chrominance signal coincides with the phase of the color burst preceding subjected to axis inversion.

The reproduced carrier chrominance signal which has been axis inverted in a manner described above is supplied to a switching circuit 138. The switching circuit 138 is adapted to switch and send out alternately the above described reproduced carrier chrominance signal and the reproduced carrier chrominance signal from the frequency converter 135 for every successive horizontal scanning period (1H), responsive to a switching pulse (whose pulse width is ½H) applied through a terminal 144 and having a frequency of one-half of horizontal scanning frequency formed from the horizontal synchronizing signal.

The reproduced carrier chrominance signal thus obtained has a characteristic described hereinafter. As well known, the PAL system adopts the quadrature phase modulation system, that is, upon subjecting two chrominance subcarriers having a phase difference of 90 degrees to balanced modulation with two color difference signals respectively, the phase of one carrier chrominance is phase shifted by 180 degrees for every successive 1H period, and the modulated waves thus obtained are added to the other chrominance subcarrier thereby to obtain the carrier chrominance signal. In the case where the carrier chrominance signal which has been frequency converted to lower frequency band and recorded is of PAL system, the reproduced carrier chrominance signal obtained by means such as means of the embodiment from the carrier chrominance signal does not show phase shifting for every 1H period, and is converted to the carrier chrominance signal which shows the same property in all of the horizontal scanning period. That is, the carrier chrominance signal thus obtained takes the signal organization which is the same as that of the carrier chrominance signal resulting from quadrature phase modulation of NTSC system.

On the other hand, when reproducing the carrier chrominance signal of the NTSC system which signal has been converted to lower frequency band, the carrier chrominance signal obtained by phase shifting one chrominance subcarrier by 180 degrees for every 1H period and by adding to the other chrominance subcarrier, that is, the signal which has the same signal structure as that of the carrier chrominance signal of a PAL system is sent out from the switching circuit 138. Accordingly, at the output of the switching circuit 138, is obtained the reproduced carrier chrominance signal wherein the color system is converted.

However, since the color burst signal part is not converted, the color burst signal is converted in a burst signal exchanging circuit 147. The signal having a frequency f2 from the reference oscillator 141 is supplied to a burst signal forming circuit 145, where the color burst signal to be converted is formed.

When converting to and reproducing the NTSC system color video signal, the burst signal forming circuit 145 forms a signal having a frequency which is substantially equal to that of the color burst signal, in the timing relationship of locating at their positions immediately after the horizontal synchronizing signal. On the other hand, when converting to and reproducing the PAL system color video signal, the burst forming circuit 145 forms the color burst signal which has a phase difference of 90 degrees mutually every successive 1H period. The color burst signal thus formed is fed to a phase adjusting circuit 146, where its phase is adjusted to coincide with the phase of the reproduced carrier chrominance signal. Then, the phase adjusted signal is supplied to the burst signal exchanging circuit 147, where it is subjected to exchange with the reproduced carrier chrominance signal at a specific position thereof.

The reproduced carrier chrominance signal of which the color system has been converted in this manner is supplied to the adding circuit 148, where it is multiplexed with the reproduced luminance signal from the synchronizing signal processing circuit 133. The resulting signal passes a through video signal output circuit 149 and thereafter is led out as a system-converted reproduced color video signal through an output terminal 150.

Here, when the system has been converted from the PAL system to the NTSC system, or vice versa, according to the present embodiment, the organization of the carrier chrominance signal is throughly converted. However, since the property of what forms the carrier chrominance signal and that of the color difference signal are different in either PAL or NTSC system, a hue on the picture screen is not exactly the same between in the recording mode and in the mode of system conversion and reproduction. This is because of that signal components of two color difference signals, i.e., I and Q signals, in the NTSC system do not coincide with signal component of two color difference signals represented by U and V signals in the PAL system. Here, by previously adjusting the hue so as to be able to reproduce colors such as skin-color by means of the phase adjusting circuit 146, the above described no-coincidence of hue does not almost give rise to problems in practical use.

Figure 16:
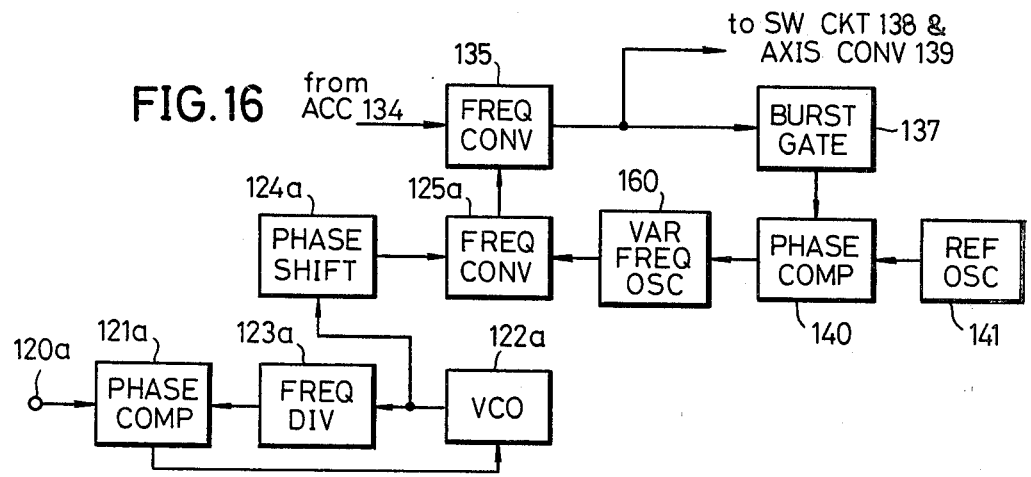
FIGS. 16, 17, and 18 are block diagrams respectively showing other embodiments of a part of the block diagram in FIG. 15.

FIG. 16 shows another embodiment, in part, of the block diagram indicated in FIG. 15. In FIG. 16, parts which are the same as corresponding parts in FIG. 15 are designated by like reference numerals, and parts which corresponds to parts in FIG. 14 are designated by like reference numerals with subscript a. Detailed description of such parts will not be repeated. The present embodiment will be applied effectively only to the apparatus for reproducing the magnetic tape which has been recorded by the methods such as indicated in FIG. 14. A recording system of the present invention is substantially the same as the recording system indicated in FIG. 14, with the exception that a variable frequency oscillator 160 is provided instead of the local oscillator 126, and the oscillator 160 is variably controlled by a phase comparison error voltage from a phase comparator 140 in a manner such that the phase of the output oscillation signal thereof synchronizes that of the reproduced color burst signal. In the present embodiment, the horizontal synchronizing signal in the reproduced color video signal is supplied through the input terminal 120a to the phase comparator 121a, and the resulting error signal from the phase comparator 121a operates to control the VCO 122a. Accordingly, the present embodiment has a special feature that any change of relative linear speed between the tape and heads when the system conversion takes place is resultingly corrected.

As has been described heretofore, the mutual conversion between PAL system and NTSC system can be achieved in a simplified manner. However, the SECAM system has a carrier chrominance signal the organization of which differs essentially from that of NTSC system and PAL system. Accordingly, the mutual system conversion between SECAM system and PAL system or NTSC system can not be accomplished by the simplified manner set forth above.

Figure 17:
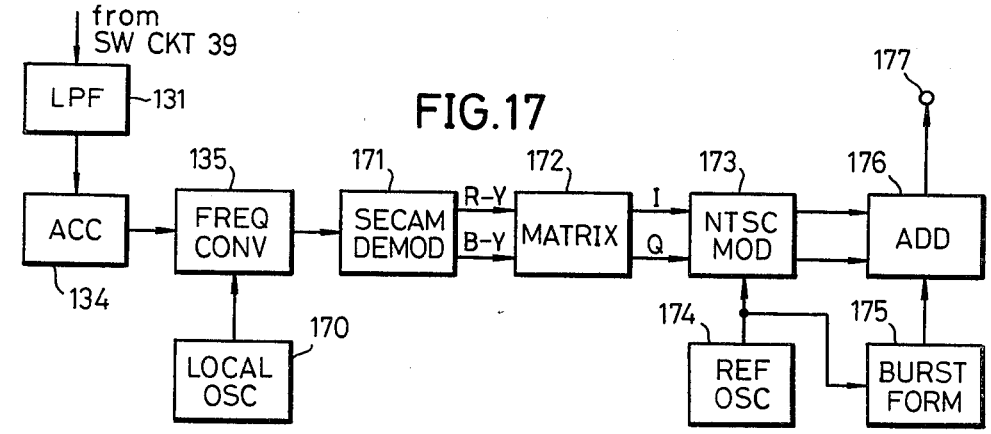
Figure 18:
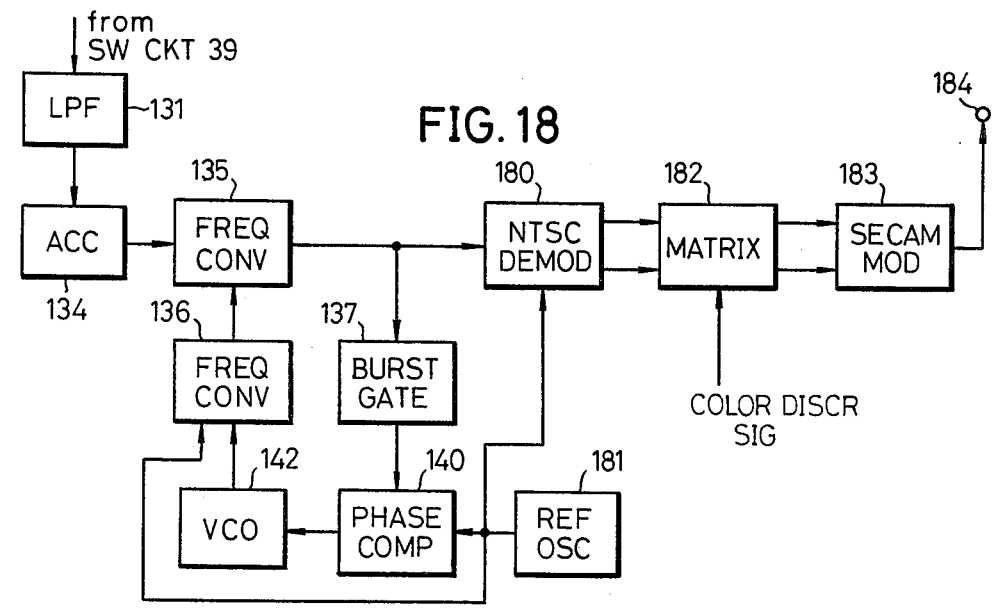

The mutual conversion between the PAL system (or NTSC system) and the SECAM system will be carried out by the reproduction system indicated in FIG. 17 or FIG. 18. These embodiments in FIG. 17 or FIG. 18 are also preferred for stictly carrying out mutual conversion between the PAL system and the NTSC system.

FIG. 17 shows an essential part of the embodiment which is adapted to convert the SECAM system color video signal having been recorded on the magnetic tape by such a method indicated in FIG. 13 to the NTSC system color video signal and then to reproduce the signal thus converted. Parts in FIG. 17 which correspond to parts in FIG. 15 are designated by like reference numerals. Detailed description of such parts will not be repeated. A local oscillator 170 generates a frequency signal corresponding to a stable constant frequency wherein a changed amount of a relative linear speed between the head and tape is corrected with respect to the oscillation frequency of the local oscillator 108 (FIG. 13) at the time of recording. Thus generated frequency signal is supplied to a frequency converter 135, where the reproduced lower band converted carrier chrominance signal is frequency converted to the carrier chrominance signal having a frequency band which is the same as that at the time of recording. This carrier chrominance signal thus frequency converted is supplied from the frequency converter 135 to a SECAM demodulator 171. The SECAM demodulator 171 is a decoder for a standard SECAM system carrier chrominance signal, and includes therein a so-called a filter with characteristics of inverted-bell shape, a limiter, a 1H delay line, a switcher, two frequency demodulators, a blanking process circuit, a color discrimination circuit, and the like. The operation and structural organization of the SECAM demodulator 171 are well-known technique in a technical field of SECAM system color television.

Two color difference signals (B−Y) and (R−Y) which are demodulated by and produced from the SECAM demodulator 171 are supplied to a matrix circuit 172, where they are respectively converted to I and Q signals conforming to the NTSC system.

The signals I and Q from the matrix circuit 172 are respectively supplied to an NTSC modulator 173 including therein two balanced modulators, that is, an I modulator, and a Q modulator. There, they are subjected to quadrature phase modulation with a stable signal, as a carrier, which is generated by a reference oscillator 174 and has a frequency f2 (3.58 MHz). Then, the signals thus modulated is supplied to an adding circuit 176. The output signal of the reference oscillator 174 is further supplied to a burst forming circuit 175, where it is converted to a burst wave signal located at a position in terms of time immediately after the horizontal synchronizing signal. Thus converted burst wave signal is then supplied as a color burst signal to the adding circuit 176. Accordingly, from the adding circuit 176 is obtained through a terminal 177 a carrier chrominance signal of NTSC system, which signal is fed to the adding circuit 148 indicated in FIG. 15.

According to the system set forth above, it is capable of converting the recorded color video signal of the SECAM system to the color video signal of the NTSC system, and of reproducing the signal thus converted.

Next, a description is given of an embodiment for converting the NTSC system color video signal to the SECAM system carrier chrominance signal and for reproducing the signal thus converted, with reference to FIG. 18. Parts in FIG. 18 which correspond to parts in FIG. 15 are designated by like reference numerals. Detailed description of such parts will be omitted.

A signal which has been frequency converted in the frequency converter 135 with the signal for frequency conversion from the frequency converter 136 and has passed through a band-pass filter (not shown) is the reproduced carrier chrominance signal of the NTSC system. This signal is supplied respectively to an NTSC demodulator 180 and a burst gate circuit 137. In the NTSC demodulator 180, the NTSC system reproduced carrier chrominance signal is demodulated with a reference signal having a stable single frequency 3.58 MHz from a reference oscillator 181, whereby two color difference signals are obtained. The demodulator 180 may be organized similar to the general organization in the color television. The two color difference signals thus demodulated may be either the signals I and Q, or the color difference signals (R−Y) and (B−Y). Furthermore, the reproduced carrier chrominance signal may be demodulated to the color difference signals of the other form.

Two color difference signals thus demodulated is supplied to a matrix circuit 182, where they are matrixed to be two color difference signals which conforms to the SECAM system. In addition, a color discrimination signal required for the SECAM system is separately supplied to the matrix circuit 182, where it is added to the two color difference signals of the SECAM system. The color difference signals are then fed to a SECAM modulator 183, which carries out frequency modulation conforming to the SECAM system.

Accordingly, the reproduced carrier chrominance signal is converted to a SECAM system carrier chrominance signal in the SECAM modulator 183 and is sent out therefrom. The SECAM system carrier chrominance signal is led out through a terminal 184 and is then supplied to the adding circuit 148 (FIG. 15), where it is added with the reproduced luminance signal thereby to be the SECAM system color video signal.

When the NTSC system is to be converted to the SECAM system, it is sufficient that the matrix circuit 182 and the SECAM modulator 183 are organized respectively so as to conform the PAL system. As a signal applied to the matrix circuit 182, a reproduced and demodulated signal may be used, if necessary, in addition to the above described demodulated two color difference signals.

Further, this invention is not limited to these embodiments but various variations and modifications may be made without departing from the scope of the invention.

What is claimed is:

1. An apparatus for reproducing a video signal of a certain system having a field frequency F1 and a number N1 of horizontal scanning lines within one field period which has been recorded on a magnetic tape travelling at a speed S1 along a plurality of mutually parallel tracks formed obliquely relative to the longitudinal direction of the tape, with conversion of the video signal to a video signal of another system having a field frequency F2 and a number N2 of horizontal scanning lines, said reproducing apparatus comprising:

means for causing said tape to travel at a speed S2 which is represented by the equation $$S2 = F2/F1 \; S1; \text{ and}$$

reproducing means for causing rotary heads to trace each track on said travelling magnetic tape thereby utilizing a signal over a tracing range of a length l2 substantially as a reproduced signal corresponding to a unit field amount, said length l2 being represented by the equation $$l2 = (N2/N1)l1,$$

wherein l1 is the length of the recording track corresponding to a unit field amount of the recorded signal on the magnetic tape.

2. A reproducing apparatus as claimed in claim 1 in which said reproducing means comprises:
a drum of a diameter d2 with said magnetic tape wrapped obliquely therearound over a specific range and determining a tracing range and tracing locus of said rotary heads on the magnetic tape, said diameter d2 being represented by the equation $$d2 = N2/N1\, d1,$$

wherein d1 is the diameter of a drum of an apparatus for recording the video signal of said certain system on said magnetic tape; and
means for causing said rotary heads to rotate at a rotating speed R2 represented by the equation $$R2 = (F2/F1)R1,$$

wherein R1 is a rotating speed of rotary heads of the apparatus for recording the video signal of said certain system on said magnetic tape.

3. A reproducing apparatus as claimed in claim 2 in which
the number of horizontal scanning lines N2 is $N2 < N1$,
said drum of said reproducing apparatus being wrapped with said magnetic tape in such a manner that each of said rotary heads carries out reproduction in an overlapped manner over a length of the tape which is substantially (l1−l2) in the tracks on the magnetic tape, and
said reproducing means comprising:
switching means for removing the overlapped parts in the signals reproduced by said respective rotary heads and for switching the reproduced signals thereby obtaining a continuous reproduced signal;
means for detecting rotation signals responsive to rotation of said rotary heads;
means for forming artificial vertical synchronizing signals from vertical synchronizing signals in the signals reproduced by said respective rotary heads and said rotation detection signal; and
means for inserting said artificial vertical synchronizing signals into said continuous reproduced signal at the switching points thereof.

4. A reproducing apparatus as claimed in claim 3 in which said reproducing means further comprises:
means for separating the vertical synchronizing signals from the signals reproduced by said rotary heads;
means for delaying said separated vertical synchronizing signals and then supplying the vertical synchronizing signals thus delayed to said artificial vertical synchronizing signals forming means; and
means for forming switching signals from the vertical synchronizing signals from said delaying means and said rotation detection signals and for supplying said switching signals thus formed to said switching means.

5. A reproducing apparatus as claimed in claim 4 in which said reproducing means further comprises means for variably changing delay time of said delaying means, timing of said artificial vertical synchronizing signals and said switching signals being adjusted through delay time adjustment by said variably changing means.

6. A reproducing apparatus as claimed in claim 2 in which
the number of horizontal scanning lines N2 is $N2 < N1$,
said drum of said reproducing apparatus being wrapped with said magnetic tape in such a manner that each of said rotary heads carries out reproduction in an overlapped manner over a length of the tape which is substantially (l1−l2) in the tracks on the magnetic tape,
said magnetic tape having a control signal recorded thereon which further comprises means for reproducing said control signal from said magnetic tape, means for detecting rotation signals responsive to rotation of said rotary heads, and means responsive to said reproduced control signal and said rotation detection signals for obtaining a rotation control signal and for controlling the rotation of said rotary heads responsive to said rotation control signal; and
in which said reproducing means comprises means for delaying said rotation detection signal, means for forming a switching signal from said rotation detection signals and said delayed rotation detection signals, means for forming artificial vertical synchronizing signals from said rotation detection signals and said delayed rotation detection signals, switching means operated responsive to said switching signals supplied thereto, said switching means removing the overlapped parts in the signals reproduced by said respective rotary heads and switching the reproduced signals thereby obtaining a continuous reproduced signal, and means for inserting said artificial vertical synchronizing signals into said continuous reproduced signal at the switching points thereof.

7. A reproducing apparatus as claimed in claim 6 in which said reproducing means further comprises means for variably changing delay time of said delaying means, timing of said artificial vertical synchronizing signals and said switching signals being adjusted through delay time adjustment by said variably changing means.

8. A reproducing apparatus as claimed in claim 2 in which the number of horizontal scanning lines N2 is determined such that $N2 > N1$;
said reproducing means comprises switching means for switching the signals reproduced by said respective rotary heads thereby to obtain a series of reproduced signals;
means for detecting rotation signals responsive to rotation of said rotary heads,
means for forming artificial vertical synchronizing signals from vertical synchronizing signals in the signals reproduced by said respective rotary heads and said rotation detection signals, means for forming artificial horizontal synchronizing signals from the horizontal synchronizing signals in the signals reproduced from said rotary heads and said rotation detection signals, and means for inserting respectively said artificial vertical synchronizing signals and said artificial horizontal synchronizing signals into said series of reproduced signals obtained through switching at the switching points and at positions in the vicinity of the switching points.

9. A reproducing apparatus as claimed in claim 8, in which said artificial vertical synchronizing signal forming means generates as output said artificial vertical synchronizing signals with delay by a time substantially corresponding to a period slightly less than an even field period with respect to the vertical synchronizing signals in said reproduced signals.

10. A reproducing apparatus as claimed in claim 1 in which the video signal which has been recorded on said magnetic tape comprises a frequency modulated luminance signal which is separated from a color video signal of said certain system having a chrominance subcarrier frequency f1 and is then frequency modulated, and a frequency converted carrier chrominance signal which is separated from said color video signal and is then frequency converted to a frequency band lower than that of said frequency modulated luminance signal; said reproducing means further comprises means for frequency demodulating said frequency modulated luminance signal separated from said reproduced signals, and means for frequency converting said frequency converted carrier chrominance signal separated from said reproduced signal in such a manner that the chrominance subcarrier frequency becomes f2.

11. A reproducing apparatus as claimed in claim 10 in which said color video signal which has been recorded on said magnetic tape is of PAL system (or NTSC system) color video signal, said reproducing means further comprises:

means for inverting the carrier chrominance signal which has been reproduced and frequency converted with respect to a V-axis for every successive horizontal scanning period;

means for switching and sending out said frequency converted carrier chrominance signal and the output signal of said inversion means alternately for every successive horizontal scanning period;

a reference oscillation means for supplying to said frequency converting means a signal for frequency conversion;

means for forming an artificial color burst signal from the output signal of said reference oscillation means; and means for exchanging a color burst signal in the output signal of said switching means with said artificial color burst signal thus formed, said reproduced signal being generated as a color video signal of an artificial NTSC system (or PAL system).

12. A reproducing apparatus as claimed in claim 10 in which said color video signal which has been recorded on said magnetic tape is of a SECAM system (or NTSC system, or PAL system) color video signal, said reproducing means further comprises:

means for demodulating said frequency converted carrier chrominance signal to two color difference signals of the SECAM system (or NTSC system, or PAL system);

means for matrixing at least said demodulated two color difference signals thereby to obtain new two color difference signals; and means for modulating said new two color difference signals thus obtained thereby to obtain a carrier chrominance signal whose chrominance subcarrier frequency f2 conforms to either the NTSC system or PAL system (or SECAM system).

* * * * *